(12) United States Patent
Yamada

(10) Patent No.: US 6,222,580 B1
(45) Date of Patent: Apr. 24, 2001

(54) IMAGE FORMING METHOD AND APPARATUS

(75) Inventor: Kazuro Yamada, Shizuoka-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/324,043

(22) Filed: Jun. 2, 1999

(30) Foreign Application Priority Data

Jun. 3, 1998 (JP) .................................. 10-154711

(51) Int. Cl.⁷ .................................................. B41J 2/435
(52) U.S. Cl. .......................... 347/247; 347/237; 347/132
(58) Field of Search .................................. 347/247, 237, 347/236, 246, 238, 239, 240, 252, 253, 243, 259, 130, 135, 132

(56) References Cited

U.S. PATENT DOCUMENTS

| | | | |
|---|---|---|---|
| 5,365,258 | * 11/1994 | Murata et al. | 347/236 |
| 5,373,518 | 12/1994 | Uchiyama et al. | 372/38 |
| 5,463,410 | 10/1995 | Uchiyama et al. | 347/133 |
| 5,475,414 | 12/1995 | Isaka et al. | 347/129 |
| 5,610,646 | 3/1997 | Isaka et al. | 347/131 |
| 5,774,165 | * 6/1998 | Nakajima et al. | 347/236 |
| 5,796,508 | * 11/1998 | Suzuki | 359/224 |
| 5,943,082 | 8/1999 | Uchiyama et al. | 347/156 |

* cited by examiner

Primary Examiner—N. Le
Assistant Examiner—Lamson D. Nguyen
(74) Attorney, Agent, or Firm—Fitzpatrick, Cella, Harper & Scinto

(57) ABSTRACT

In an electrophotographic image formation, a driving current for laser emission is pulse-width-modulated in correspondence with externally input image data. The pulse width modulation of the driving current is started after a predetermined time period has passed from a time point of beam detection by a light detector located at a position leading a photosensitive drum in a main scanning direction. The driving current is adjusted in correspondence with the light amount detected. Current adjustment data is supplied to a current modulation circuit in the same manner as image data. Detection is made of the laser beam, which is pulse-width-modulated by the current modulation circuit on the basis of the supplied adjustment data, and is emitted from the laser light source, by a laser monitor device under control of a monitor controller. Data supply and detection control by the monitor controller are started after a predetermined time period has passed from a time point of beam detection by the detector, when a pulse width of the current modulation circuit is adjusted in correspondence with the detected light amount.

13 Claims, 9 Drawing Sheets

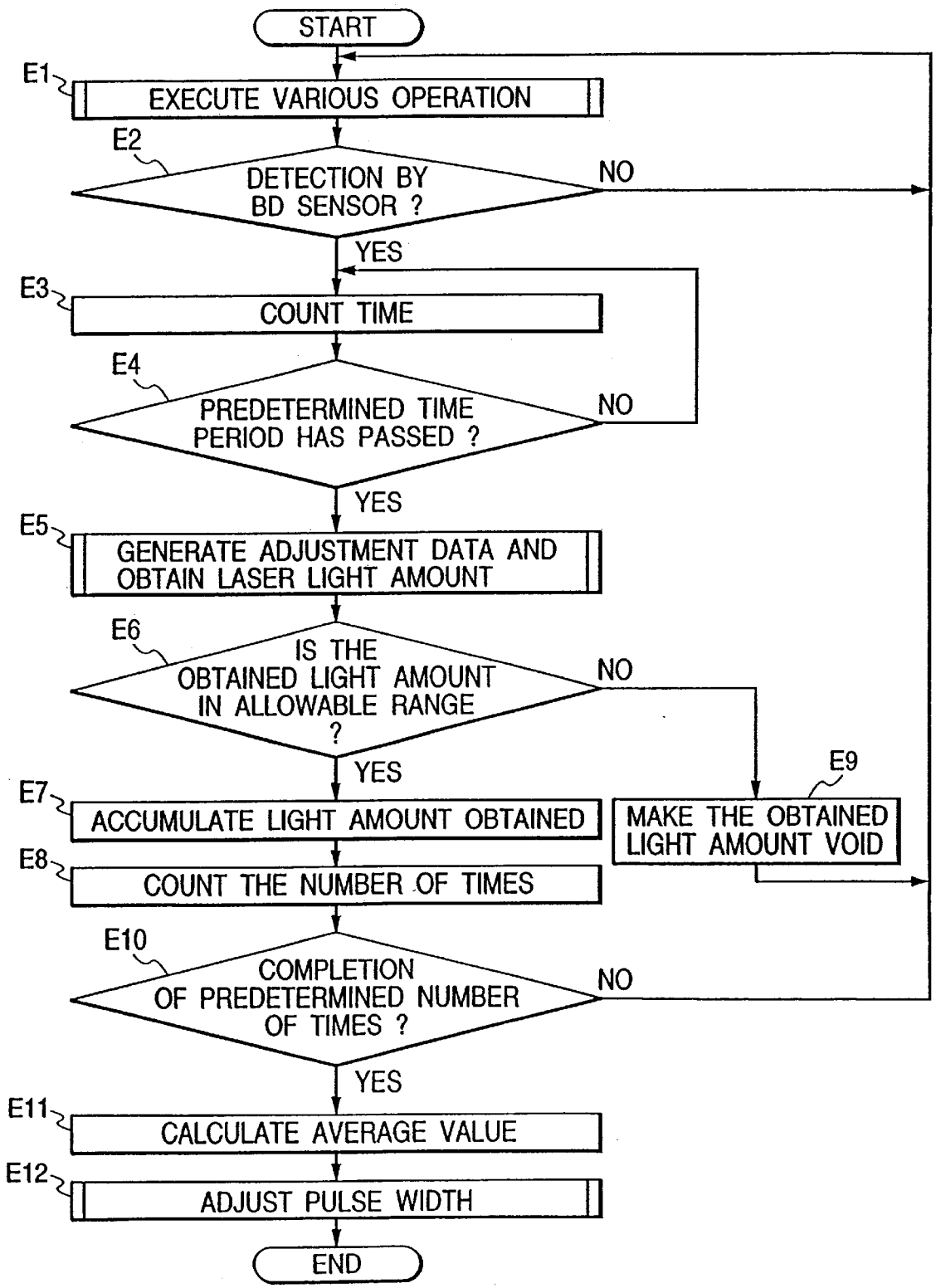

IMAGE FORMING METHOD AND APPARATUS

BACKGROUND OF THE INVENTION

1. Field of the Invention

The present invention relates to an electrophotographic image forming method and apparatus, in which a driving current to be supplied to a laser output means is pulse-width-modulated in correspondence with image data.

2. Related Background Art

Conventionally, an electrophotographic image forming apparatus such as a laser printer or the like comprises a semiconductor laser as a laser output means, and supplies a driving current to this semiconductor laser to make it output a laser beam of a corresponding amount. At this time, the laser beam output from the semiconductor laser is modulated in correspondence with image data, and is deflected and scanned in the main scanning direction by a rotating polygonal mirror or the like. At the same time, a photosensitive drum as a latent image carrier means is rotated to move its circumferential surface which is an exposure area in the sub-scanning direction, and the circumferential surface of the photosensitive drum, which is moving in the sub-scanning direction is charged by a charger.

The charged circumferential surface of the photosensitive drum, which is rotating in the sub-scanning direction, is scanned and exposed by the deflected and scanned laser beam to form an electrostatic latent image thereon, which is developed using toner by a developer as a latent image developing means. The developed toner image on the circumferential surface of the photosensitive drum is transferred onto a recording medium by a transfer charger as a toner transfer means, and the toner image transferred onto the recording medium is fixed by a fixing device.

In the above-mentioned image forming apparatus, since a print image is formed by a large number of dots in a matrix, a gradation image can be formed even by binary dots using a dither method or the like. However, since such method lowers the resolution of the print image, an image forming apparatus which forms a gradation image using multi-valued dots is now available.

In such image forming apparatus, for example, when a driving current supplied to the semiconductor laser is pulse-width-modulated in correspondence with image data, the emission time of the semiconductor laser is varied in units of dots. In this case, since each of a large number of dots that form the print image is formed to have a size corresponding to the image resolution, a high-resolution image which is graduated in units of dots can be formed. Furthermore, in such image forming apparatus, since the driving current is adjusted by monitoring the amount of light output from the semiconductor laser, the laser beam amount can be maintained constant.

One prior art of a laser printer as the above-mentioned image forming apparatus will be explained below with reference to FIGS. 1 to 4. Note that FIG. 1 is a schematic block diagram showing principal part of the laser printer, FIG. 2 is a schematic plan view showing the positional relationship among optical parts of the laser printer, FIG. 3 is a circuit diagram showing the internal arrangement of a laser driver and the like, and FIG. 4 is a timing chart showing the relationship among various signals.

As shown in FIG. 1 and the like, a laser printer 1 of this prior art comprises a laser device 2, which integrates a semiconductor laser 3 serving as a laser output means, and a photodiode 4 serving as a laser monitor means. The semiconductor laser 3 outputs a laser beam in correspondence with an input driving current, and the photodiode 4 monitors the laser beam output from the semiconductor laser 3 to output a current signal corresponding to the light amount.

A main body power supply 5 and laser driver 6 are connected to the laser device 2, and they form a current supply means for generating a driving current. A current modulation circuit 7 corresponding to a current modulation means is connected to the laser driver 6, and a data generation means 8 corresponding to a data input means is connected to the current modulation circuit 7.

The data generation circuit 8 comprises a communication I/F (Interface) to which an external apparatus such as a host computer or the like is connected, and externally receives image data defined by a large number of main scanning lines, which are continuous in the sub-scanning direction. The current modulation circuit 7 pulse-width-modulates a driving current supplied to the semiconductor laser 3 in correspondence with image data externally input to the data generation circuit 8 in cooperation with the main body power supply 5 and laser driver 6.

The reflection surface of a polygonal mirror 11 corresponding to a beam deflection means is located on the optical axis of the semiconductor laser 3 of the laser device 2, as shown in FIG. 2, and the circumferential surface of a photosensitive drum 12 serving as a latent image carrier means is located on the reflection optical path of this polygonal mirror 11 via, e.g., a correction optical system (not shown) such as an f-θ lens and the like.

The polygonal mirror 11 is rotatably axially supported by a scanner motor (not shown), and deflects and scans a laser beam output from the semiconductor laser 3 in the main scanning direction. The photosensitive drum 12 is rotatably axially supported by a drum driving mechanism (not shown) as a sub-scanning means, to relatively move its circumferential surface, which is scanned and exposed by the laser beam, in the sub-scanning direction.

A BD (Beam Detect) sensor 13 as a beam detection means is placed at a position that leads the photosensitive drum 12 in the main scanning direction within the scan range of the polygonal mirror 11. The BD sensor 13 detects the laser beam deflected and scanned by the polygonal mirror 11 immediately before the laser beam reaches the photosensitive drum 12.

As shown in FIG. 3, an operation control circuit 15 is connected to the BD sensor 13 via an amplifier 14, and is connected to the current modulation circuit 7 and laser driver 6. The operation control circuit 15 comprises, e.g., a microcomputer, and serves as various means when an appropriate control program is installed as its software.

For example, the operation control circuit 15 serves as an exposure control means and output control means when it controls the operation of the current modulation circuit 7 in correspondence with the laser beam detection timing of the BD sensor 13. In this case, as shown in FIG. 4, the operation control circuit 15 controls the semiconductor laser 3 to continuously output a laser beam at a timing the laser beam deflected and scanned by the polygonal mirror is detected by the BD sensor 13, and controls the current modulation circuit 7 to start pulse width modulation of the driving current units of main scanning lines of image data a predetermined period of time after the beam detection timing of the BD sensor 13.

Also, the photodiode 4 of the laser device 2 is connected to the operation control circuit 15 via an amplifier 16. In this case, the operation control circuit 15 serves as a detection control means, and controls the photodiode 4 to detect the laser beam continuously output from the semiconductor laser 3.

The laser driver 6 comprises a laser driving circuit 17 and an APC (Automatic Power Control) circuit 18 corresponding to a current adjustment means. The laser driving circuit 17 is connected to the semiconductor laser 3 in the laser device 2 and to the current modulation circuit 7, and supplies a driving current, which is modulated in correspondence with image data, to the semiconductor laser 3.

The laser driving circuit 17 comprises an analog switch 21, current buffer transistor 22, resistor 23, operational amplifier 24, and the like. The analog switch 21 comprises, e.g., a CMOS (Complementary Metal Oxide Semiconductor) or the like, that is capable of high-speed operation, and turns on/off the semiconductor laser 3 in response to a control signal supplied from the current modulation circuit 7.

The current buffer transistor 22 and resistor 23 are connected in series with the analog switch 21, and the operational amplifier 24 is connected to the base of the current buffer transistor 22, whose emitter is feedback-connected to the negative input terminal of the operational amplifier 24.

The photodiode 4 in the laser device 2, the operation control circuit 15, and the current modulation circuit 7 are connected to the APC circuit 18, which adjusts the driving current generated by the laser driving circuit 17 in correspondence with the light amount detected by the photodiode 4 under the control of the operation control circuit 15.

The APC circuit 18 comprises a comparator 25, constant voltage power supply 26, analog switch 27, hold capacitor 28, and the like. The hold capacitor 28 is connected to the positive input terminal of the operational amplifier 24 in the laser driving circuit 17. The photodiode 4 in the laser device 2 and a resistor 29 are connected to the negative input terminal of the comparator 25, and the constant voltage power supply 26 is connected to the positive input terminal thereof.

The comparator 25 compares the detected voltage input from the photodiode 4, and a reference voltage generated by the constant voltage power supply 26, and outputs the comparison result as high and low signals. The analog switch 27 connects/disconnects the comparator 25 and hold capacitor 28 in response to a sample & hold signal input from the operation control circuit 15.

When the hold capacitor 28 is connected to the comparator 25 by the analog switch 27, it holds a voltage corresponding to the output signal from the comparator 25; when the hold capacitor 28 is disconnected from the comparator 25 by the analog switch 27, it applies the hold voltage to the operational amplifier 24 in the laser driving circuit 17.

Note that the operation control circuit 15 outputs a sampling signal to control the analog switch 27 in the APC circuit 18 to connect the hold capacitor 28 to the comparator 25 at a timing the laser beam deflected and scanned by the polygonal mirror 11 hits the BD sensor 13. On the other hand, the operation control circuit 15 outputs a hold circuit to control the analog switch 27 to disconnect the comparator 25 from the hold capacitor 28 at a timing the deflected and scanned laser beam strikes the photosensitive drum 12.

Various devices such as a charger as a carrier charging means, a developer as a latent image developing means, a transfer charger as a toner transfer means, and the like are placed around the photosensitive drum 12 in addition to the above-mentioned laser scanning mechanism, although their illustration and description will be omitted since their structure is known to those who are skilled in the art. Also, a convey path of a print paper sheet as a recording medium is formed in the gap between the transfer charger and photosensitive drum 12.

The laser printer 1 with the above-mentioned structure can form an image by electrophotography. In this case, a driving current supplied from the main body power supply 5 and laser driver 6 to the semiconductor laser 3 in the laser device 2 is modulated by the current modulation circuit 7 in correspondence with image data externally input from the host computer or the like to the data generation circuit 8.

That is, since the current modulation circuit 7 controls ON/OFF of the analog switch 21 in the laser driving circuit 17 of the laser driver 6 in correspondence with image data, a laser beam that has been modulated in correspondence with the image data is emitted from the semiconductor laser 3.

The laser beam emitted from the semiconductor laser 3 in correspondence with the image data in this way is deflectively scanned in the main scanning direction by the rotating polygonal mirror 11, and is irradiated on the circumferential surface of the photosensitive drum 12, which is rotating in the sub-scanning direction, thus forming an electrostatic latent image as a large number of main scanning lines there.

At this time, since the deflectively scanned laser beam is detected by the BD sensor 13 immediately before it reaches the polygonal mirror 11, the start positions of a large number of main scanning lines, which are continuous in the sub-scanning direction, can be aligned by effecting the emission of a laser beam corresponding to the image data after a predetermined period of time has passed after beam detection by the BD sensor 13.

Since the detection of the laser beam by the BD sensor 13 is required prior to the image scanning, the semiconductor laser 3 continuously emits a laser beam under the control of the operation control circuit 15 at a timing when the deflectively scanned laser beam is irradiated on the BD sensor 13.

In this laser printer 1, when the semiconductor laser 3 continuously emits the laser beam to the BD sensor 13, as described above, the amount of light emitted from the semiconductor laser 3 is detected by the photodiode 4 using the continuously emission laser beam, and the APC circuit 18 in the laser driver 6 adjusts the driving current.

In this case, since the comparator 25 in the APC circuit 18 compares the voltage detected by the photodiode with the reference voltage output from the constant voltage power supply 26, the operation control circuit 15 controls the analog switch 27 in the APC circuit 18 to connect the comparator 25 to the hold capacitor 28 and controls the hold capacitor 28 to hold a voltage corresponding to the amount of light output from the semiconductor laser 3 at a timing the semiconductor laser 3 continuously emits the laser beam.

At a timing the semiconductor laser 3 emits the laser beam to the photosensitive drum 12, the operation control circuit 15 controls the analog switch 27 in the APC circuit 18 to disconnect the comparator 25 from the hold capacitor 28. Hence, the laser driving circuit 17 supplies a driving current corresponding to the voltage held by the hold capacitor 28 to the semiconductor laser 3.

Since the laser beam is pulse-width-modulated in correspondence with image data, the aforementioned laser printer 1 can form a dot-matrix print image which is gradated in units of dots. At this time, since the driving current is adjusted to make the amount of the laser beam continuously emitted from the semiconductor laser 3 constant, thus forming a high-quality image which is gradated in units of dots.

In the image forming apparatus such as the above-mentioned laser printer 1 or the like, a laser beam is pulse-width-modulated in correspondence with image data so as to form an image which is gradated in units of dots, and the amount of light continuously emitted from the semiconductor laser 3 is adjusted to become constant so as to maintain high image quality of a grayscale image.

However, in the image forming apparatus such as the above-mentioned laser printer 1 or the like, in order to maintain high image quality of a grayscale (gradation) image, the pulse width of pulse width modulation must also be appropriately adjusted. Hence, the pulse width of the laser printer 1 is adjusted in, e.g., the final stage of the conventional manufacturing process before the product is delivered.

For this reason, as shown in FIG. 1, the current modulation circuit 7 includes a variable resistor in which maximum and minimum pulse widths are variably set. By adjusting this variable resistor, the pulse width upon modulating the laser beam in correspondence with image data is appropriately set.

In this case, a dedicated light-receiving sensor (not shown) is placed at the position of the photosensitive drum 12, and predetermined adjustment data is input to the data generation circuit 8 in the same manner as image data. In this way, laser beams, which have been modulated to have various pulse widths, are emitted, and their amounts are detected. Then, the pulse width is adjusted to obtain an appropriate light amount.

Upon adjusting the pulse width in this fashion, the light-receiving sensor is placed at the position of the photosensitive drum 12. However, since the position of the light-receiving sensor in the main scanning direction is arbitrarily determined by the operator, it varies in the main scanning direction from one operator to another. In the aforementioned laser printer 1, the amount of the continuously emitted laser beam is monitored by the photodiode 4 immediately before a main scan, and the hold capacitor 28 holds a voltage to obtain an appropriate driving current of the semiconductor laser 3. However, the voltage held by the hold capacitor 28 varies due to charges leaking from the operational amplifier 24 during the main scan.

For this reason, since the position of the light-receiving sensor varies in the main scanning direction from one operator to another, the measurement condition of the amount of the pulse-width-modulated laser beam varies depending on operators, and the pulse widths of laser printers 1 mass-produced cannot be appropriately and uniquely adjusted. For example, a jig or the like can be designed to locate the light-receiving sensor at an identical position. Even in this case, the dedicated light-receiving sensor must be placed at the position of the photosensitive drum 12, resulting in cumbersome operations.

Furthermore, since the aforementioned adjustment is done only before the product is delivered, changes resulting from environments or as a function of time after product delivery cannot be coped with. For example, such adjustment may be done at the time of maintenance by a service engineer. However, in this case, daily changes resulting from environments cannot be coped with in real time.

In addition, upon measuring the amount of the pulse-width-modulated laser beam, the light amount may be erroneously measured due to mixed noise, and the pulse width may be adjusted to a wrong value. Such case can be coped with when the operator repeats light amount measurement to select an appropriate measurement result. However, the load on the operator increases unwantedly.

SUMMARY OF THE INVENTION

The present invention has been made in consideration of the above situation, and has as its object to provide an image forming method and apparatus which can always appropriately adjust the pulse width without any troublesome operations in an electrophotographic image forming apparatus that pulse-width-modulates a laser beam.

According to the present invention, there is provided an electrophotographic image forming method, in which when a laser beam emitted from laser emitting means in response to a driving current supplied from current supply means is deflected and scanned by beam deflection means in a main scanning direction, and exposes and scans latent image carrier means which moves in a sub-scanning direction, the driving current is pulse-width-modulated by current modulation means in correspondence with externally input image data, a latent image formed on the latent image carrier means is developed by toner and is transferred onto a recording medium, pulse width modulation of the driving current is started after a predetermined time period has passed from a time point of beam detection by beam detection means which is located at a position which leads the latent image carrier means in the main scanning direction, when the beam detection means detects the deflectively scanned laser beam, the laser emitting means is controlled to continuously emit a laser beam and laser monitor means detects a light amount of the laser beam, and the driving current of the current supply means is adjusted in correspondence with the detected light amount, comprising the steps of:

generating predetermined adjustment data by adjustment supply means, and supplying the adjustment data to the current modulation means in the same manner as image data; detecting the laser beam, which is pulse-width-modulated by the current modulation means on the basis of the supplied adjustment data, and is emitted from the laser emitting means, by the laser monitor means under the control of monitor control means; and starting data supply by the adjustment supply means and detection control by the monitor control means after a predetermined time period has passed from a time point of beam detection of the beam detection means, when a pulse width of the current modulation means is adjusted in correspondence with the detected light amount.

The image forming method of the present invention can form an image which is gradated in units of dots by pulse-width-modulating a laser beam in correspondence with image data. For example, the pulse width that modulates the laser beam can be adjusted at a predetermined timing when no image is formed. In this case, the light amount measurement of the laser beam for adjusting the pulse width of modulation is executed at a given position in the main scanning direction. Also, the light amount measurement of the laser beam for adjusting the pulse width is done by the existing laser monitor means which measures the amount of the laser beam to adjust the driving current. In this way, the operation for measuring the amount of the pulse-width-modulated laser beam and adjusting the pulse width is executed as one function of the image forming apparatus.

According to the present invention, there is also provided an electrophotographic image forming method, in which when a laser beam emitted from laser emitting means in response to a driving current supplied from current supply means is deflected and scanned by beam deflection means in a main scanning direction, and exposes and scans latent image carrier means which moves in a sub-scanning direction, the driving current is pulse-width-modulated by current modulation means in correspondence with externally input image data, and a latent image formed on the latent image carrier means is developed by toner and is transferred onto a recording medium, comprising the steps of:

generating predetermined adjustment data and repetitively supplying the adjustment data to the current modulation means in the same manner as image data; detecting each of laser beams, which are pulse-width-modulated by the current modulation means on the basis of the supplied adjustment data, and are emitted from the laser emitting means, by the laser monitor means; and calculating an average value of a plurality of detected light amounts, and adjusting a pulse width of the current modulation means in correspondence with the calculated average value of the light amounts.

The image forming method of the present invention can form an image which is gradated in units of dots by pulse-width-modulating a laser beam in correspondence with image data. For example, the pulse width that modulates the laser beam can be adjusted at a predetermined timing when no image is formed. In this case, since the pulse width of the current modulation means is adjusted in correspondence with the average value of a plurality of light amounts, the light amount measurement of the laser beam for adjusting the pulse width is done by the existing laser monitor means which measures the amount of the laser beam to adjust the driving current. In this way, the operation for measuring the amount of the pulse-width-modulated laser beam and adjusting the pulse width is executed as one function of the image forming apparatus.

According to the present invention, in the aforementioned image forming method, when the average value of the plurality of light amounts is calculated, a light amount which does not satisfy a predetermined allowable range is excluded in advance from the plurality of light amounts as an invalid light amount, and the average value is calculated using valid light amounts. Therefore, the light amount inappropriately measured due to mixed noise is not used in adjustment of the pulse width.

According to the present invention, there is also provided an electrophotographic image forming apparatus, in which when a laser beam emitted from laser emitting means in response to a driving current supplied from current supply means is deflected and scanned by beam deflection means in a main scanning direction, and exposes and scans latent image carrier means which moves in a sub-scanning direction, the driving current is pulse-width-modulated by current modulation means in correspondence with externally input image data, a latent image formed on the latent image carrier means is developed by toner and is transferred onto a recording medium, pulse width modulation of the driving current is started after a predetermined time period has passed from a time point of beam detection by beam detection means which is located at a position which leads the latent image carrier means in the main scanning direction, when the beam detection means detects the deflectively scanned laser beam, the laser emitting means is controlled to continuously emit a laser beam and laser monitor means detects a light amount of the laser beam, and the driving current of the current supply means is adjusted in correspondence with the detected light amount, comprising:

adjustment supply means for generating predetermined adjustment data, and supplying the adjustment data to the current modulation means in the same manner as image data; monitor control means for controlling the laser monitor means to detect the laser beam, which is pulse-width-modulated by the current modulation means on the basis of the supplied adjustment data, and is emitted from the laser emitting means; pulse adjustment means for adjusting a pulse width of the current modulation means in correspondence with the light amount detected by the laser monitor means under the control of the monitor control means; and adjustment control means for starting data supply by the adjustment supply means and detection control by the monitor control means after a predetermined time period has passed from a time point of beam detection of the beam detection means.

The image forming apparatus of the present invention can form an image which is gradated in units of dots by pulse-width-modulating a laser beam in correspondence with image data. At this time, since the deflectively scanned laser beam is detected by the beam detection means before the latent image carrier means, the start positions of a large number of main scanning lines that form an image can be maintained constant. When the laser emitting means is controlled to continuously emit a laser beam to be detected by the beam detection means in this way, the laser monitor means measures the light amount and the driving current of the current supply means is appropriately adjusted, thus maintaining constant the light amount upon continuously emitting the laser beam. The image forming apparatus according to the present invention also adjusts the pulse width for modulating the laser beam at, e.g., a predetermined timing when no image is formed. In this case, when the adjustment supply means generates predetermined adjustment data and supplies it to the current modulation means in the same manner as image data, since the monitor control means controls the laser monitor means to detect the laser beam, which is pulse-width-modulated by the current modulation means based on the supplied adjustment data and is emitted from the laser emitting means, the pulse adjustment means can adjust the pulse width of the current modulation means in correspondence with the light amount detected by the laser monitor means. At this time, since the adjustment control means controls to initiate data supply by the adjustment supply means and detection control by the monitor control means after a predetermined time period has passed from a time point of beam detection of the beam detection means, the amount of the laser beam is measured at a given position in the main scanning direction. Also, the light amount measurement of the laser beam for adjusting the pulse width is done by the existing laser monitor means that measures the amount of the laser beam to adjust the driving current. In this manner, the operation for measuring the amount of the pulse-width-modulated laser beam and adjusting the pulse width is executed as one function of the image forming apparatus.

According to the present invention, there is also provided an image forming apparatus comprising: current supply means for generating a driving current; laser emitting means for emitting a laser beam in correspondence with the driving current supplied from the current supply means; beam deflection means for deflecting and scanning the laser beam emitted from the laser emitting means in a main scanning direction; latent image carrier means exposed and scanned by the laser beam deflectively scanned by the beam deflection means; beam detection means for detecting the laser beam deflectively scanned by the beam deflection means at a position which leads the latent image carrier means in the main scanning direction; data input means for externally inputting image data formed by a large number of main scanning lines, which are continuous in a sub-scanning direction; current modulation means for pulse-width-modulating the driving current generated by the current supply means in correspondence with the image data externally input to the data input means; exposure control means for starting pulse with modulation in units of main scanning lines by the current modulation means after a predetermined time period has passed from a time point of beam detection of the beam detection means; sub-scanning means for moving an exposure position of the latent image carrier means in the sub-scanning direction; latent image developing means for developing a latent image formed at the exposure position of the latent image carrier means, which is moved by the sub-scanning means in the sub-scanning direction, by toner; toner transfer means for transferring a toner image on the latent image carrier means developed by the latent image developing means onto a recording medium; laser monitor means for detecting a light amount of the laser beam emitted from the laser emitting means; emission control means for controlling the laser emitting means to continuously emit the laser beam at a timing when the laser beam deflectivley scanned by the beam deflection means is detected by the beam detection means; detection control means for controlling the laser monitor means to detect the laser beam, which is continuously emitted from the laser emitting means under the control of the emission control means; current adjustment means for adjusting the driving current of the current supply means in correspondence with the light amount, which is detected by the laser monitor means under the control of the detection control means; adjustment supply means for generating predetermined adjustment data and supplying the adjustment data to the current modulation means in the same manner as image data; monitor control means for controlling the laser monitor means to detect the laser beam which is pulse-width-modulated by the current modulation means on the basis of the adjustment data supplied from the adjustment supply means, and is emitted from the laser emitting means; pulse adjustment means for adjusting a pulse width of the current modulation means in correspondence with the light amount, which is detected by the laser monitor means under the control of the monitor control means; and adjustment control means for starting data supply by the adjustment supply means and detection control by the monitor control means after a predetermined time period has passed from a time point of beam detection of the beam detection means.

The image forming apparatus of the present invention can form an image which is gradated in units of dots by pulse-width-modulating a laser beam in correspondence with image data. At this time, since the deflectivley scanned laser beam is detected by the beam detection means before the latent image carrier means, the start positions of a large number of main scanning lines that form an image can be maintained constant. When the laser emitting means is controlled to continuously emit a laser beam to be detected by the beam detection means in this way, the laser monitor means measures the light amount and the driving current of the current supply means is appropriately adjusted, thus maintaining constant the light amount upon continuously emitting the laser beam. The image forming apparatus according to the present invention also adjusts the pulse width for modulating the laser beam at, e.g., a predetermined timing when no image is formed. In this case, when the adjustment supply means generates predetermined adjustment data and supplies it to the current modulation means in the same manner as image data, since the monitor control means controls the laser monitor means to detect the laser beam, which is pulse-width-modulated by the current modulation means based on the supplied adjustment data and is emitted from the laser emitting means, the pulse adjustment means can adjust the pulse width of the current modulation means in correspondence with the light amount detected by the laser monitor means. At this time, since the adjustment control means controls to initiate data supply by the adjustment supply means and detection control by the monitor control means after a predetermined time period has passed from a time point of beam detection of the beam detection means, the amount of the laser beam is measured at a given position in the main scanning direction. Also, the light amount measurement of the laser beam for adjusting the pulse width is done by the existing laser monitor means that measures the amount of the laser beam to adjust the driving current. In this way, the operation for measuring the amount of the pulse-width-modulated laser beam and adjusting the pulse width is executed as one function of the image forming apparatus.

According to the present invention, in the image forming apparatus, the adjustment control means starts data supply by the adjustment supply means and detection control by the monitor control means at a timing when the laser beam deflectively scanned by the beam deflection means is located at a main scanning center of an exposure position of the latent image carrier means.

Therefore, since the adjustment control means controls to start data supply by the adjustment supply means and detection control by the monitor control means at a timing the laser beam deflectively scanned by the beam deflection means is located at the main scanning center of the exposure position of the latent image carrier means, the light amount measurement of the laser beam for adjusting the modulation pulse width can be done at an optimal position in the main scanning direction.

According to the present invention, in the image forming apparatus, the adjustment supply means repetitively supplies the adjustment data to the current modulation means, the monitor control means controls the laser monitor means to detect each of laser beams which are repetitively emitted from the laser emitting means, and the apparatus further comprises average value calculation means for calculating an average value of a plurality of light amounts, which are detected by the laser monitor means under the control of the monitor control means, and the pulse adjustment means adjusts the pulse width of the current modulation means in correspondence with the average value of the light amounts calculated by the average calculation means.

The adjustment supply means repetitively supplies adjustment data to the current modulation means, and the monitor control means controls the laser monitor means to detect each of the laser beams repetitively emitted from the laser emitting means. The average calculation means calculates the average value of a plurality of light amounts detected in this manner, and the pulse adjustment means adjusts the pulse width of the current modulation means in correspondence with the average value of the light amounts, thus accurately measuring the light amount used for adjusting the pulse width.

According to the present invention, there is also provided an electrophotographic image forming apparatus, in which when a laser beam emitted from laser emitting means in response to a driving current supplied from current supply means is deflected and scanned by beam deflection means in a main scanning direction, and exposes and scans latent image carrier means which moves in a sub-scanning direction, the driving current is pulse-width-modulated by current modulation means in correspondence with externally input image data, and a latent image formed on the latent image carrier means is developed by toner and is transferred onto a recording medium, comprising:

adjustment supply means for generating predetermined adjustment data and repetitively supplying the adjustment data to the current modulation means in the same manner as image data; monitor control means for controlling the laser monitor means to detect each of laser beams, which are pulse-width-modulated by the current modulation means on the basis of the supplied adjustment data, and are repetitively emitted from the laser emitting means; average calculation means for calculating an average value of a plurality of light amounts, which are detected by the laser monitor means under the control of the monitor control means; and pulse adjustment means for adjusting a pulse width of the current modulation means in correspondence with the average value of the light amounts calculated by the average calculation means.

The image forming apparatus of the present invention can form an image which is gradated in units of dots by pulse-width-modulating a laser beam in correspondence with image data. At this time, since the deflectively scanned laser beam is detected by the beam detection means before scanning of the latent image carrier means, the start positions of a large number of main scanning lines that form an image can be maintained constant. When the laser emitting means is controlled to continuously emit a laser beam to be detected by the beam detection means in this way, the laser monitor means measures the light amount and the driving current of the current supply means is appropriately adjusted, thus maintaining constant the light amount upon continuously emitting the laser beam. The image forming apparatus according to the present invention also adjusts the pulse width for modulating the laser beam at, e.g., a predetermined timing when no image is formed. In this case, when the adjustment supply means generates predetermined adjustment data and repetitively supplies it to the current modulation means in the same manner as image data, the monitor control means controls the laser monitor means to detect each of the laser beams, which are pulse-width-modulated by the current modulation means based on the repetitively supplied adjustment data and are emitted from the laser emitting means. The average calculation means calculates the average value of the plurality of light amounts detected in this manner, and the pulse adjustment means adjusts the pulse width of the current modulation means in correspondence with the average value of the light amounts, thus accurately measuring the light amount used for adjusting the pulse width. Also, the light amount measurement of the laser beam for adjusting the pulse width is done by the existing laser monitor means that measures the amount of the laser beam to adjust the driving current. In this way, the operation for measuring the amount of the pulse-width-modulated laser beam and adjusting the pulse width is executed as one function of the image forming apparatus.

According to the present invention, in the image forming apparatus, the average value calculation means excludes a light amount, which does not satisfy a predetermined allowable range, in advance from the plurality of light amounts as an invalid light amount, and calculates the average value using valid light amounts.

Therefore, the average calculation means excludes a light amount or amounts that do not satisfy a predetermined allowable range from a plurality of light amounts detected by the laser monitor means, as invalid light amounts, and calculates the average value using only valid ones. Hence, any light amount inappropriately measured due to mixed noise or the like is not used in adjustment of the pulse width.

According to the present invention, the image forming apparatus further comprises operation control means for operating at least the adjustment supply means, the monitor control means, and the pulse adjustment means at a predetermined timing when image formation is not executed.

Since the operation control means controls to operate at least the adjustment supply means, monitor control means, and pulse adjustment means at a predetermined timing when the image forming apparatus does not execute image formation, the operation for adjusting the modulation pulse width of the laser beam is executed at a predetermined timing when no image is formed.

According to the present invention, in the image forming apparatus, the operation control means operates at least the adjustment supply means, the monitor control means, and the pulse adjustment means upon executing initialization. Since the operation control means controls to operate various means upon executing initialization of the image forming apparatus, the image forming apparatus is ready to form an image after the modulation pulse width of the laser beam is appropriately adjusted.

Note that various means in the present invention need only implement their corresponding functions. For example, these means may be implemented by dedicated hardware, a computer provided with appropriate functions by a program, functions implemented by an appropriate program in a computer, their combinations, and the like.

BRIEF DESCRIPTION OF THE DRAWINGS

FIG. 3 is a circuit diagram showing the internal arrangement of a laser driver and the like;

FIG. 9 is a flow chart showing principal part of an image forming method according to a second modification.

DETAILED DESCRIPTION OF THE PREFERRED EMBODIMENTS

Figure 1:
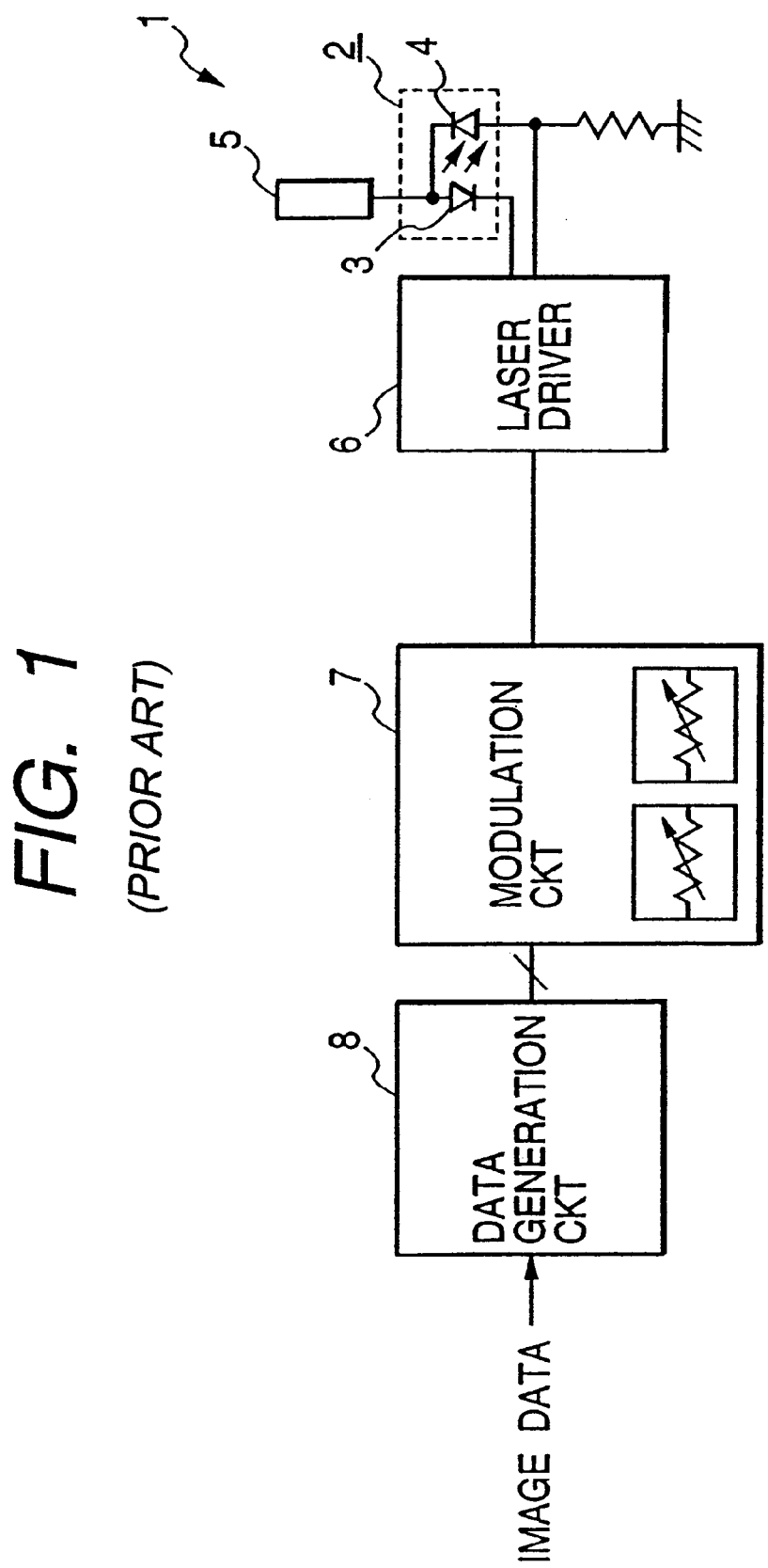
FIG. 1 is a schematic block diagram showing principal part of a laser printer.
Figure 2:
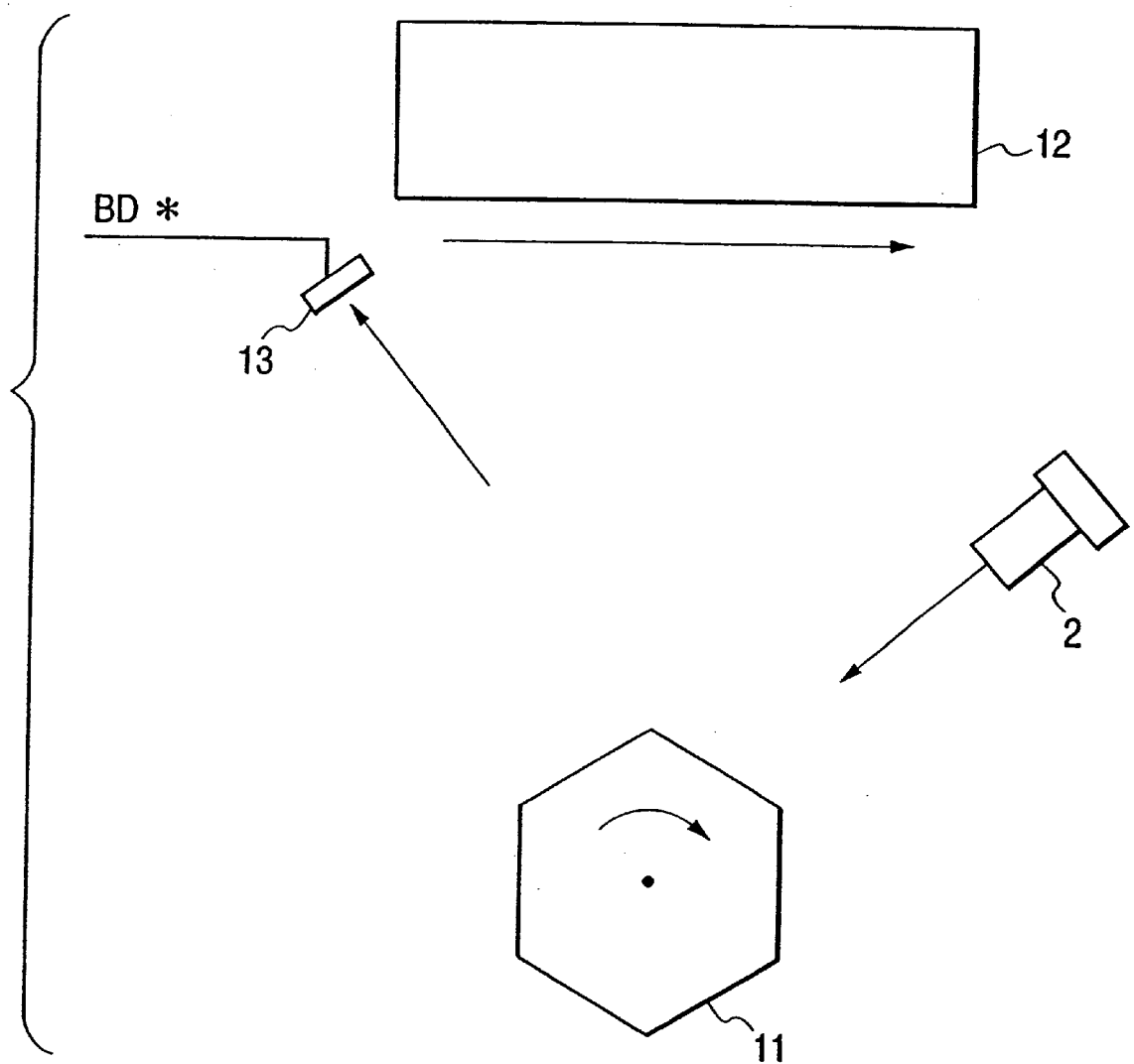
FIG. 2 is a plan view showing the positional relationship among optical parts of the laser printer.
Figure 3:
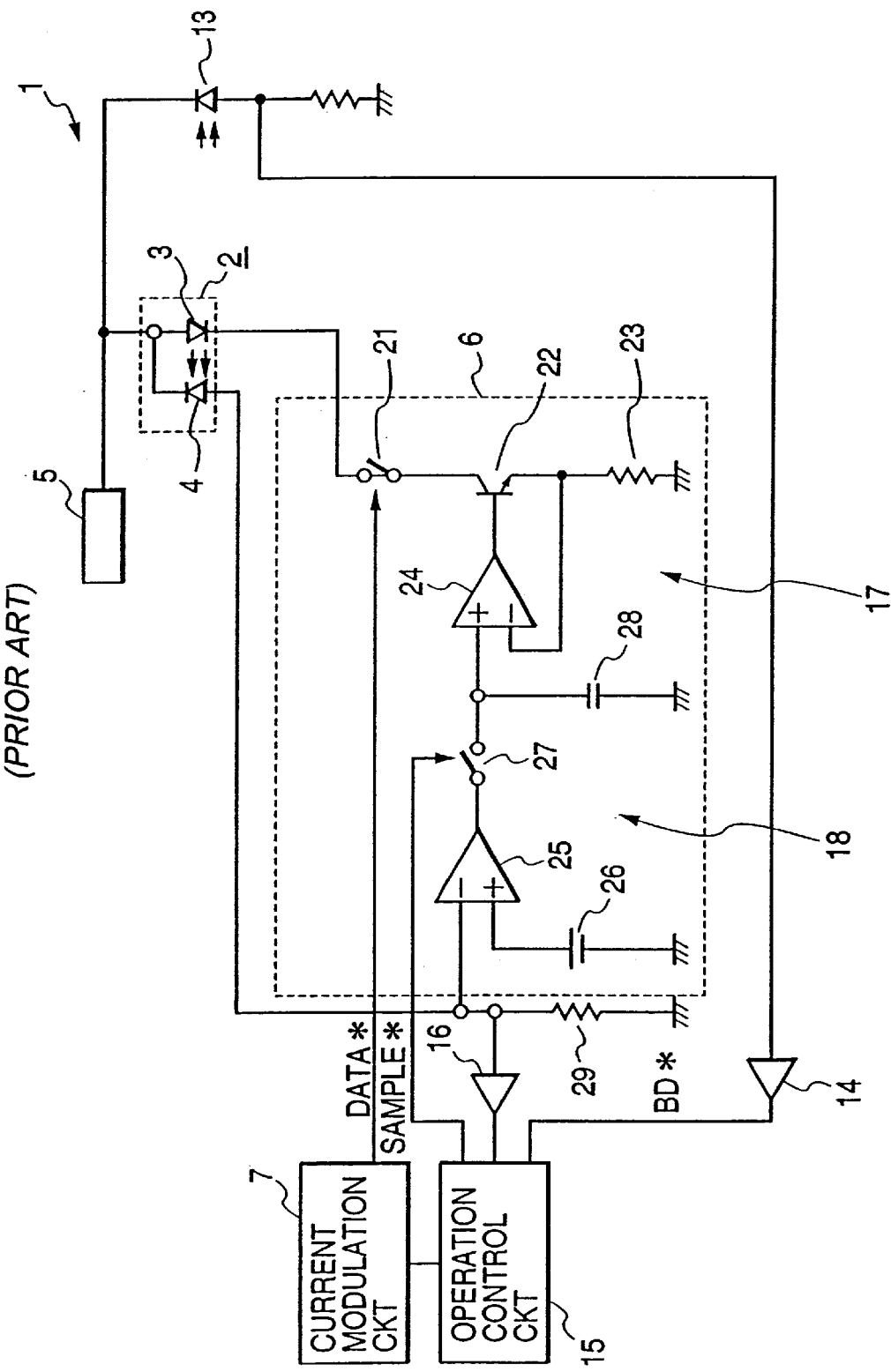
Figure 4:
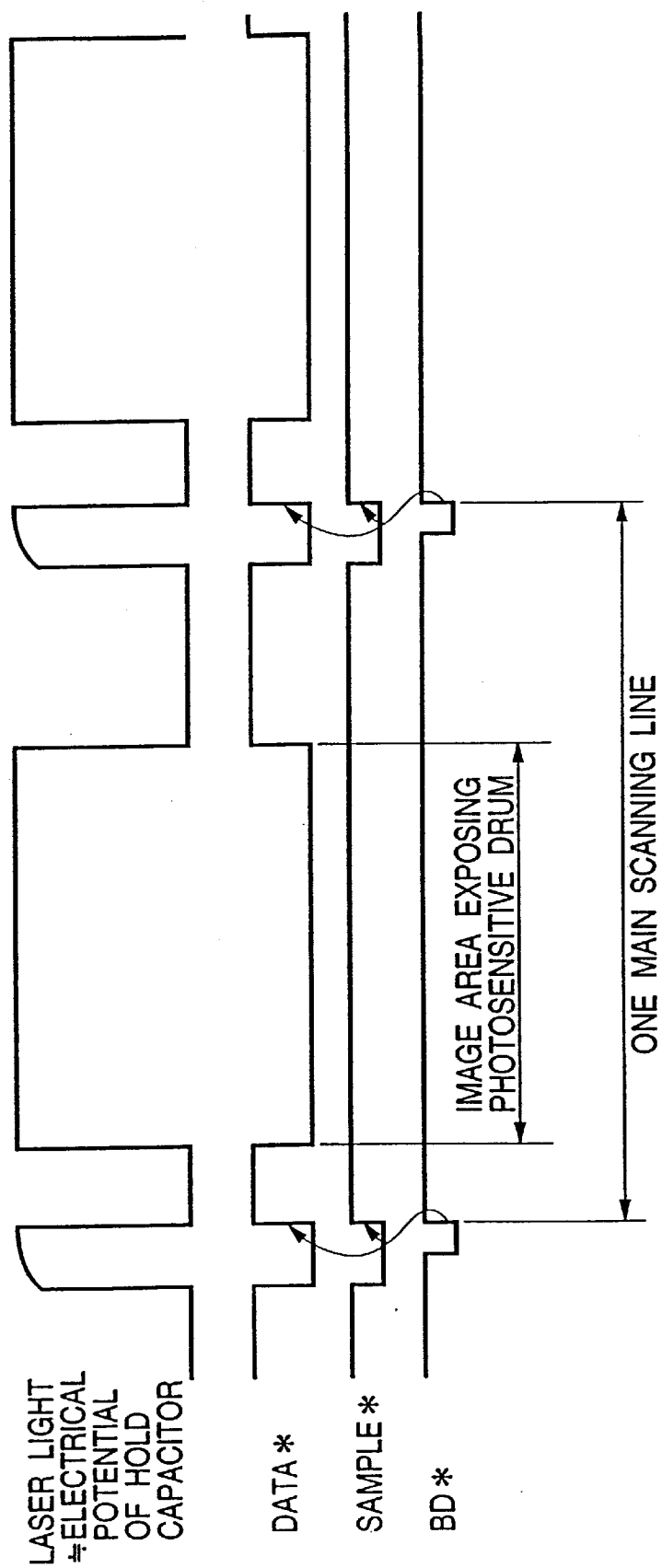
FIG. 4 is a timing chart showing the relationship among various signals.

The preferred embodiment of the present invention will be described below with reference to FIGS. 5 to 9. Note that the same reference numerals in this embodiment denote the same parts as in the conventional example described above and a detailed description thereof will be omitted.

Figure 5:
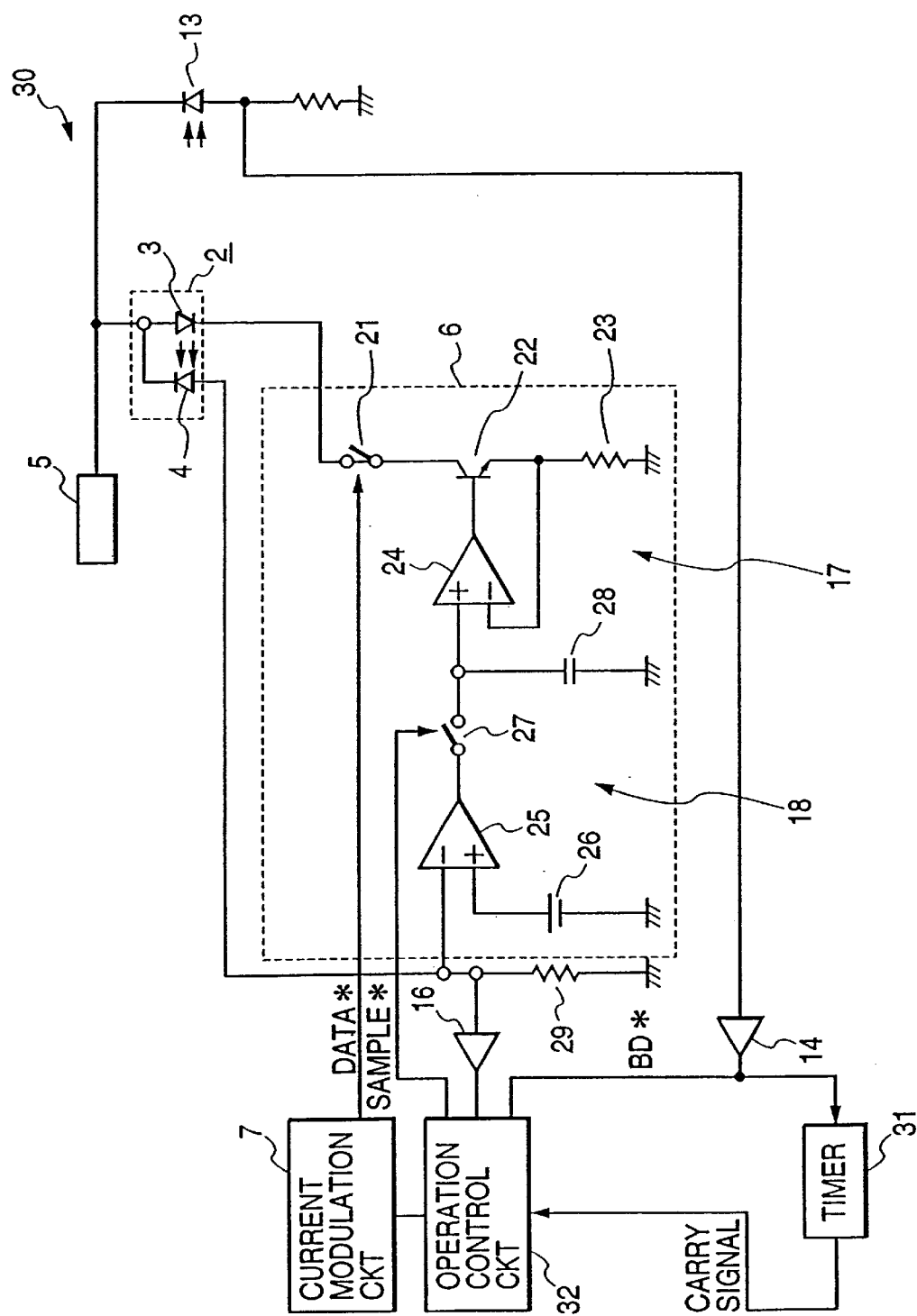
FIG. 5 is a block diagram showing principal part of a laser printer as an embodiment of an image forming apparatus according to the present invention.
Figure 6:
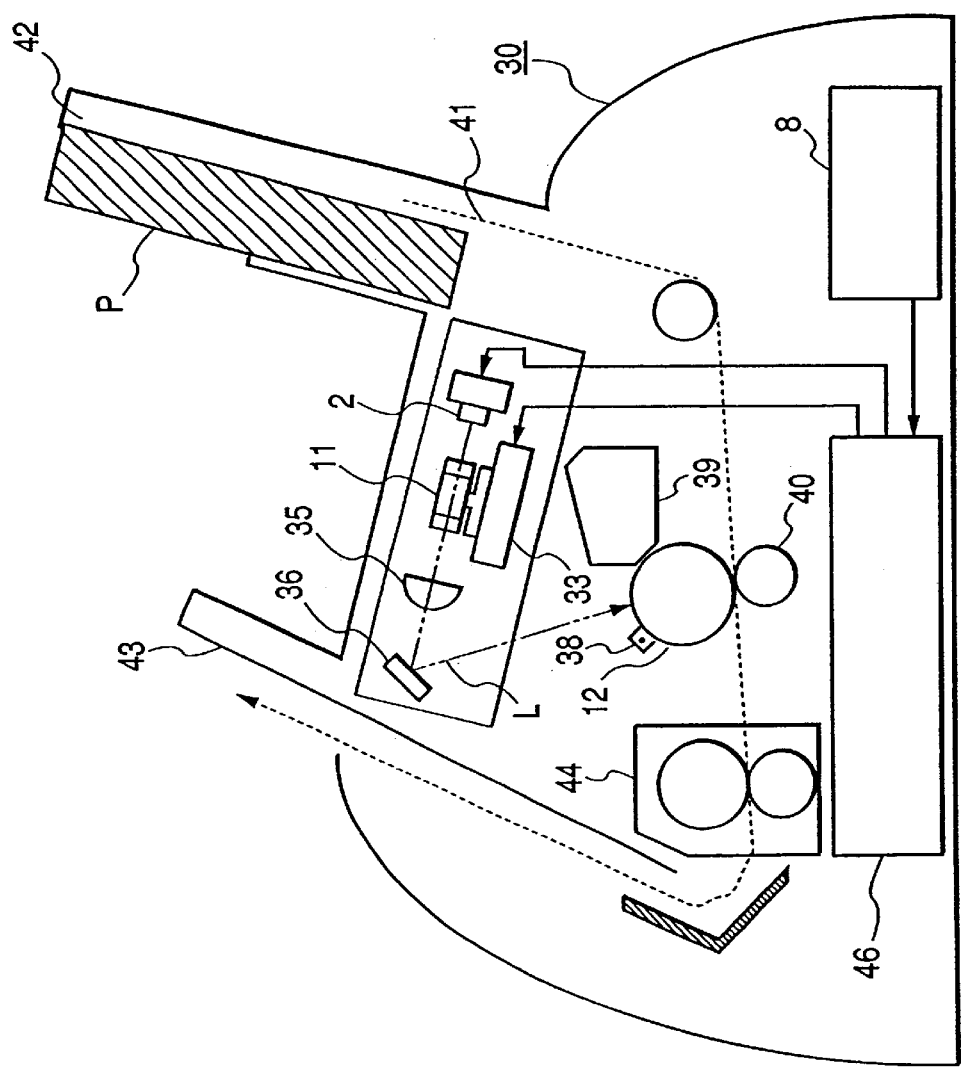
FIG. 6 is a longitudinal sectional view showing the internal arrangement of the laser printer.
Figure 7:
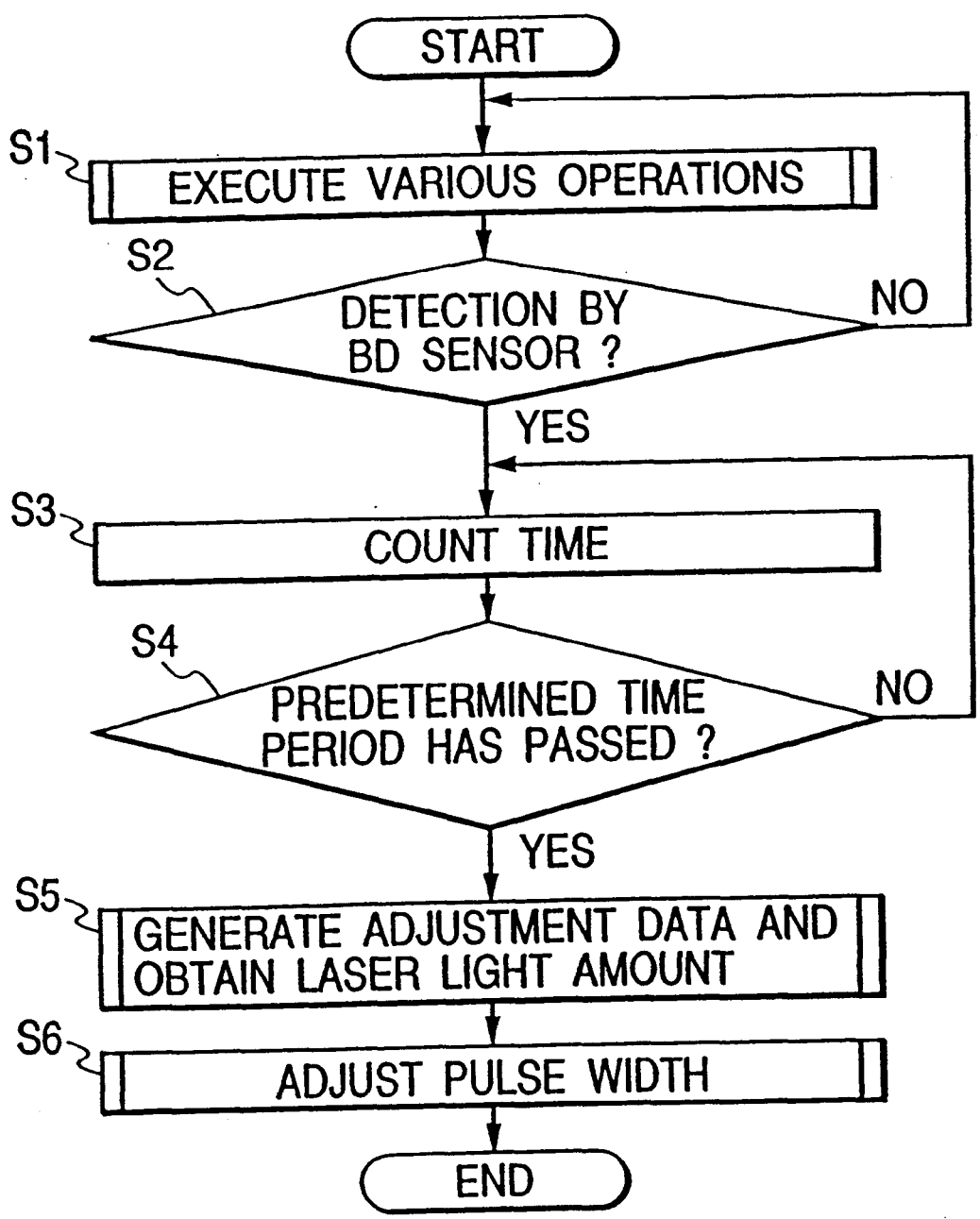
FIG. 7 is a flow chart showing principal part of an image forming method according to the embodiment shown in FIG. 5.
Figure 8:
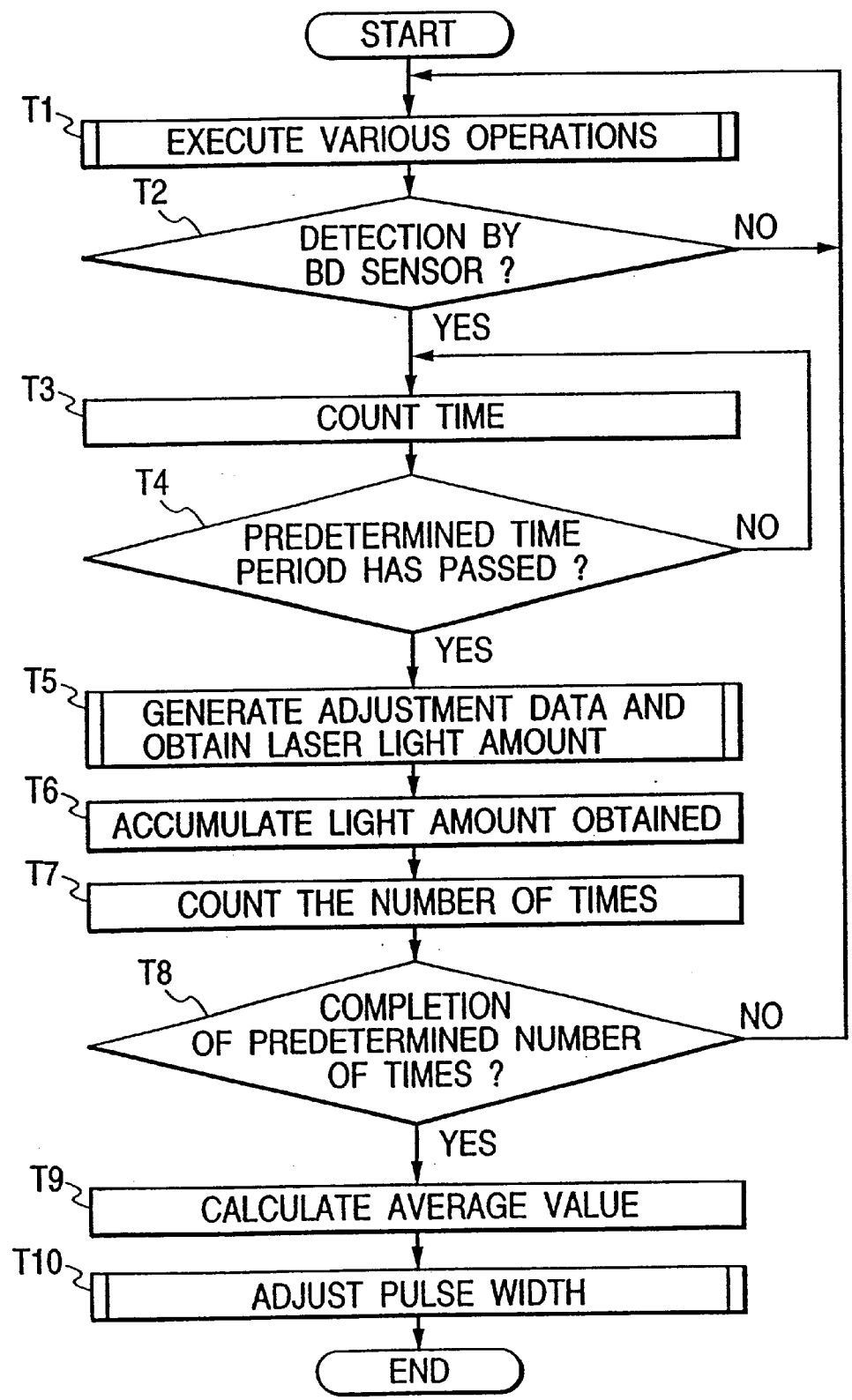
FIG. 8 is a flow chart showing principal part of an image forming method according to a first modification.

FIG. 5 is a block diagram showing principal part of a laser printer as an image forming apparatus of this embodiment, FIG. 6 is a longitudinal sectional view showing the internal arrangement of the laser printer, FIG. 7 is a flow chart showing principal part of an image forming method according to this embodiment, FIG. 8 is a flow chart showing principal part of an image forming method according to a first modification, and FIG. 9 is a flow chart showing principal part of an image forming method according to a second modification.

A laser printer 30 as an image forming apparatus of this embodiment is implemented to have a structure in which a timer circuit 31 corresponding to an adjustment control means is connected to the BD sensor 13 of the laser printer 1 described as the prior art, and software of an operation control circuit 32 to which the timer circuit 31 is connected is changed, as shown in FIG. 5.

The operation control circuit 32 serves as an exposure control means, output control means, detection control means, and the like upon executing image formation like the operation control circuit 15 of the aforementioned prior art. Also, the operation control circuit 32 serves as an adjustment supply means, monitor control means, pulse adjustment means, and the like upon executing initialization.

More specifically, the operation control circuit 32 serves as the adjustment supply means upon executing initialization to generate predetermined adjustment data, and supplies it to a current modulation circuit 7 in the same manner as image data. Since the current modulation circuit 7 generates a driving current pulse-width-modulated in correspondence with that adjustment data, a semiconductor laser 3 emits a laser beam pulse-width-modulated in correspondence with the adjustment data. At this time, the operation control circuit 32 serves as the monitor control means to acquire the light amount detected by a photodiode 4, and also serves as the pulse adjustment means to adjust the pulse width of the current modulation circuit 7 in correspondence with the detected light amount.

Note that the laser beam emitted from the semiconductor laser 3 is deflectively scanned by a rotating polygonal mirror 11 and is detected by a BD sensor 13 even when the operation control circuit 32 adjusts the pulse width, as described above. An APC circuit 18 adjusts the driving current of a laser driving circuit 17 in correspondence with the light amount detected by the photodiode 4 at that timing.

When the deflected and scanned laser beam is detected by the BD sensor 13, the timer circuit 31 counts a predetermined period of time, and then informs the operation control circuit 32 of an elapse of that time. Hence, the operation control circuit 32 executes supply of adjustment data by the current modulation circuit 7 and laser beam detection by the photodiode 4 at the timing corresponding to information from the timer circuit 31.

In the laser printer 30 of this embodiment, a predetermined period of time is set in the timer circuit 31, so that supply of adjustment data and laser beam detection by the operation control circuit 32 are done at the position of the main scanning center of the exposure position on a photosensitive drum 12.

Also, the laser printer 30 of this embodiment comprises a scanner motor 33, as shown in FIG. 6. The scanner motor 33 axially supports the polygonal mirror 11 to be rotatable in the main scanning direction. An f-θ lens 35 and reflection mirror 36 are placed in turn on the scanning optical path of the laser beam deflectively scanned by the polygonal mirror 11, and the circumferential surface of a photosensitive drum 12 faces the reflection optical path of the reflection mirror 36.

The photosensitive drum 12 is rotatably axially supported by a drum driving mechanism (not shown) serving as a sub-scanning means. The photosensitive drum 12 is rotated by the drum driving mechanism, and its circumferential surface moves in the sub-scanning direction. A charger 38 as a carrier charging means, a developer 39 as a latent image developing means, a transfer roller 40 as a toner transfer means, and the like are placed in turn to oppose the circumferential surface of the photosensitive drum 12, and the reflection mirror 36 faces the circumferential surface of the photosensitive drum 12 via the gap between the charger 38 and developer 39.

The charger 38 charges the circumferential surface of the photosensitive drum 12, which rotates in the sub-scanning direction, by corona discharge, and the charged circumferential surface of the photosensitive drum 12 is exposed and scanned by main scanning light reflected by the reflection mirror 36, thus forming an electrostatic latent image thereon. The developer 39 develops the electrostatic latent image formed on the photosensitive drum 12 by toner, and the transfer roller 40 transfers the toner image on the photosensitive drum 12 developed by the developer 39 onto a print paper sheet P as a recording medium by a potential difference.

In the laser printer 30 of this embodiment, a convey path 41 of the print paper sheet P is formed. A paper feed tray 42 and paper discharge tray 43 are placed at the two ends of this convey path 41. The convey path 41 of the print paper sheet P contiguous from the paper feed tray 41 passes through the gap between the photosensitive drum 12 and transfer roller 40, and communicates with the paper discharge tray 43 through the interior of a fixing device 34 as a toner fixing means. The print paper sheet P is fed along the convey path 41 from the paper feed tray 42 to the paper discharge tray 43, and the fixing device 34 fixes the toner image transferred from the photosensitive drum 12 onto the paper sheet P by heat and pressure.

In the laser printer 30 of this embodiment, the current modulation circuit 7, operation control circuit 32, and the like form a single circuit unit 46, which is connected to a data generation circuit 8, the laser driving device 17, the scanner motor 33, and the like.

An image forming method by the laser printer 30 of this embodiment with the aforementioned arrangement will be explained below. When the laser printer 30 of this embodiment forms an image, a driving current to be supplied from a main body power supply 5 and laser driver 6 to the semiconductor laser 3 in a laser device 2 is modulated by the current modulation circuit 7 in correspondence with image data externally input from a host computer or the like to the data generation circuit 8.

Since the semiconductor laser 3 emits a laser beam modulated in correspondence with the image data, the laser beam is deflected and scanned in the main scanning direction by the rotating polygonal mirror 11, and is irradiated on the circumferential surface of the photosensitive drum 12 that rotates in the sub-scanning direction.

Since the circumferential surface of the photosensitive drum 12 has been charged by corona discharge of the charger 38, a dot-matrix electrostatic latent image is formed as a large number of main scanning lines in the sub-scanning directions by exposure and scanning of the laser beam. The electrostatic latent image formed on the circumferential surface of the photosensitive drum 12 is developed by toner supplied from the developer 39 to form a toner image, and the toner image is transferred onto a print paper sheet P fed from the paper feed tray 42 along the convey path 41 by the transfer roller 40.

As the print paper sheet P on which the toner image has been transferred is fed to the fixing device 34 along the convey path 41, the toner image is fixed by heat and pressure applied by the device 34. The print paper sheet P on which the toner image has been fixed is fed along the convey path 41 and is discharged onto the paper discharge tray 43, thus completing image formation by the laser printer 30.

In the laser printer 30 of this embodiment, when the photosensitive drum 12 is exposed and scanned by the laser beam deflected and scanned by the rotating polygonal mirror 11, as described above, the laser beam is detected by the BD sensor 13 immediately before it reaches the polygonal mirror 11. By starting emission of the laser beam corresponding to image data after a predetermined period of time from that beam detection, the start positions of a large number of main scanning lines, which are continuous in the sub-scanning direction, can be aligned.

When the BD sensor 13 detects the laser beam prior to an image scan, the operation control circuit 32 controls the semiconductor laser 3 to continuously emit the laser beam, the photodetector 4 to detect the amount of the continuously emitted laser beam, and the APC circuit 18 to hold a voltage corresponding to the detected light amount by a hold capacitor 28.

In this way, since the driving current of the laser driving circuit 17 is adjusted to obtain an appropriate amount of the laser beam, the laser driving circuit 17 supplies a driving current corresponding to the voltage held by the hold capacitor 28 to the semiconductor laser 3 at a timing when the semiconductor laser 3 emits a laser beam toward the photosensitive drum 12.

Since the laser printer 30 of this embodiment pulse-width-modulates the laser beam in correspondence with image data as in the conventional laser printer 1 mentioned above, it can form a dot-matrix print image, which is gradated in units of dots. Also, since the laser printer 30 adjusts the driving current to make the amount of the laser beam continuously emitted from the semiconductor laser 3 constant, an image, which is gradated in units of dots, can be formed with high quality.

In addition, in the laser printer 30 of this embodiment, since the operation control circuit 32 appropriately adjusts the pulse width of the current modulation circuit 7 upon executing initialization, i.e., at a timing when no image formation is done, a grayscale image can be formed with higher quality.

More specifically, when the laser printer 30 is activated and initialization is started, pulse width adjustment is done as one of operations in this initialization. In this case, as shown in FIG. 7, the semiconductor laser 3 is continuously driven and the polygonal mirror 11 and the like are driven (step S1) as in image formation, and the continuously emitted laser beam is detected by the BD sensor 13 (step S2).

As the timer circuit 31 then starts counting time (step S3), the operation control circuit 32 supplies adjustment data to the current modulation circuit 7 upon completion of counting a predetermined period of time (step S4). In this manner, since the laser beam emitted from the semiconductor laser 3 is pulse-width-modulated in correspondence with the adjustment data, the operation control circuit 32 obtains the amount of the pulse-width-modulated laser beam detected by the photodiode 4 (step S5).

Since the operation control circuit 32 adjusts the pulse width of current modulation of the current modulation circuit 7 in correspondence with the obtained detected light amount (S6), pulse width adjustment is ended in this way.

Upon completion of initialization including such operations, the laser printer 30 of this embodiment is ready to form an image. Hence, the image formation is executed based on the adjusted pulse width.

The operation control circuit 32 can appropriately adjust the pulse width of the current modulation circuit 7 upon executing initialization, and the laser printer 30 of this embodiment can form a high-quality image which is gradated in units of dots by pulse width modulation.

In addition, since the light amount measurement of the laser beam for adjusting the modulation pulse width is done at a predetermined position in the main scanning direction, the influences of light amount variations of the laser beam due to charging/discharging of the hold capacitor 28 in the APC circuit 18 can be made constant. For this reason, the amount of the laser beam can be appropriately measured in consideration of charging/discharging of the hold capacitor 28, and the modulation pulse width of the current modulation circuit 7 can be accurately adjusted.

Especially, since the light amount measurement of the laser beam for adjusting the modulation pulse width is done at the central position in the main scanning direction, the pulse-width-modulated laser beam can be measured at an optimal position, and the modulation pulse width of the current modulation circuit 7 can be optimally adjusted.

Furthermore, the light amount measurement of the laser beam for adjusting the modulation pulse width is done by the existing photodiode 4 which is used in laser measurement to adjust the driving current. Therefore, the need for placing a dedicated light-receiving sensor at the position of the photosensitive drum 12 can be obviated, and the modulation pulse width of the current modulation circuit 7 can be easily adjusted by a simple structure.

Moreover, the above-mentioned adjustment of the modulation pulse width of the current modulation circuit 7 is always executed as one function of the laser printer 30, so that changes resulting from environments or as a function of time can be coped with. In particular, since the pulse width adjustment is automatically executed upon executing initialization, an image can be formed based on the satisfactorily adjusted pulse width without increasing any work load on the service engineer or user.

Note that the present invention is not limited to such specific embodiment, and various modifications may be made within the scope of the invention. For example, the laser printer 30 has been exemplified as an image forming apparatus. Alternatively, the image forming apparatus of the present invention may be applied to a digital copying machine and facsimile apparatus.

In the above embodiment, various means are implemented by various functions obtained by installing, as software, an appropriate control program in the operation control circuit 32 comprising a microcomputer. Alternatively, such means may be individually implemented as dedicated hardware components.

Furthermore, in the above embodiment, the laser beam pulse-width-modulated in correspondence with the adjustment data is emitted only once to measure its light amount only once. The average value of a plurality of light amounts obtained by repeating such operation may be calculated to improve precision of pulse width adjustment.

In this case, by installing an appropriate control program as software, the operation control circuit 32 also serves as an average value calculation means. As shown in FIG. 8, adjustment data is repetitively supplied to the current modulation circuit 7 a predetermined number of times, each of the laser beams repetitively output in correspondence with these adjustment data is detected by the photodiode 4, and the average value of a plurality of light amounts detected in this way is calculated (steps T1 to T9).

When the operation control circuit 32 adjusts the pulse width of the current modulation circuit 7 in correspondence with the average value of the light amounts (step T10), since the light amount used in pulse width adjustment is measured as the average value of a plurality of light amounts, the modulation pulse width can be adjusted with higher precision.

When a plurality of laser beams are detected by repetitively supplying adjustment data, a plurality of adjustment data may be output as one main scanning line to quickly complete the processing, or may be output as one dot in each of a plurality of main scanning lines to improve processing precision.

Furthermore, when the average value is calculated from a plurality of light amounts of laser beams, a light amount or amounts that do not satisfy a predetermined allowable range may be excluded from a plurality of detected light amounts as invalid light amounts (steps E6 and E9), and the average value may be calculated using only valid ones (steps E7 and E11), as shown in FIG. 9. In this case, since any light amount inappropriately measured due to mixed noise is not used in adjustment of the pulse width, the pulse width can be adjusted with higher precision.

As the present invention has the aforementioned arrangement, the following effects are provided.

Since an image forming method according to the present invention comprises the steps of: generating predetermined adjustment data by adjustment supply means, and supplying the adjustment data to the current modulation means in the same manner as image data; detecting the laser beam, which is pulse-width-modulated by the current modulation means on the basis of the supplied adjustment data, and is emitted from the laser emitting means, by the laser monitor means under the control of monitor control means; and starting data supply by the adjustment supply means and detection control by the monitor control means a predetermined period of time after beam detection of the beam detection means, when a pulse width of the current modulation means is adjusted in correspondence with the detected light amount, the modulation pulse width of the laser beam can be appropriately adjusted, and the light amount measurement of the laser beam for the adjustment can be executed at a predetermined position in the main scanning direction, thus making the influences upon adjusting the driving current constant, and satisfactorily adjusting the pulse width.

Since an image forming method according to the present invention comprises the steps of: generating predetermined adjustment data and repetitively supplying the adjustment data to the current modulation means in the same manner as image data; detecting each of laser beams, which are pulse-width-modulated by the current modulation means on the basis of the supplied adjustment data, and are emitted from the laser emitting means, by the laser monitor means; and calculating an average value of a plurality of detected light amounts, and adjusting a pulse width of the current modulation means in correspondence with the calculated average value of the light amounts, the modulation pulse width of the laser beam can be appropriately adjusted, and the adjustment can be done in correspondence with the average value of a plurality of light amounts of the laser beams, thus adjusting the pulse width with high precision.

According to the present invention, in the above image forming method, since a light amount which does not satisfy a predetermined allowable range is excluded in advance from the plurality of light amounts as an invalid light amount upon calculating average value of the plurality of light amounts, and the average value is calculated using valid light amounts, a light amount inappropriately measured due to mixed noise is not used in adjustment of the pulse width, thus adjusting the pulse width with higher precision.

Since an image forming apparatus according to the present invention comprises: adjustment supply means for generating predetermined adjustment data, and supplying the adjustment data to the current modulation means in the same manner as image data; monitor control means for controlling the laser monitor means to detect the laser beam, which is pulse-width-modulated by the current modulation means on the basis of the supplied adjustment data, and is emitted from the laser emitting means; pulse adjustment means for adjusting a pulse width of the current modulation means in correspondence with the light amount detected by the laser monitor means under the control of the monitor control means; and adjustment control means for starting data supply by the adjustment supply means and detection control by the monitor control means a predetermined period of time after beam detection of the beam detection means, the modulation pulse width of the laser beam can be appropriately adjusted, and the light amount measurement of the laser beam for the adjustment can be executed at a predetermined position in the main scanning direction, thus making the influences upon adjusting the driving current constant, and satisfactorily adjusting the pulse width.

Since an image forming apparatus according to the present invention comprises: current supply means for generating a driving current; laser emitting means for emitting a laser beam in correspondence with the driving current supplied from the current supply means; beam deflection means for deflecting and scanning the laser beam emitted from the laser output means in a main scanning direction; latent image carrier means exposed and scanned by the laser beam deflectively scanned by the beam deflection means; beam detection means for detecting the laser beam deflectively scanned by the beam deflection means at a position which leads the latent image carrier means in the main scanning direction; data input means for externally inputting image data formed by a large number of main scanning lines, which are continuous in a sub-scanning direction; current modulation means for pulse-width-modulating the driving current generated by the current supply means in correspondence with the image data externally input to the data input means; exposure control means for starting pulse with modulation in units of main scanning lines by the current modulation means a predetermined period of time after beam detection of the beam detection means; sub-scanning means for moving an exposure position of the latent image carrier means in the sub-scanning direction; latent image developing means for developing a latent image formed at the exposure position of the latent image carrier means, which is moved by the sub-scanning means in the sub-scanning direction, by toner; toner transfer means for transferring a toner image on the latent image carrier means developed by the latent image developing means onto a recording medium; laser monitor means for detecting a light amount of the laser beam emitted from the laser emitting means; emission control means for controlling the laser emission means to continuously emit the laser beam at a timing when the laser beam deflected and scanned by the beam deflection means is detected by the beam detection means; detection control means for controlling the laser monitor means to detect the laser beam, which is continuously emitted from the laser emitting means under the control of the emission control means; current adjustment means for adjusting the driving current of the current supply means in correspondence with the light amount, which is detected by the laser monitor means under the control of the detection control means; adjustment supply means for generating predetermined adjustment data and supplying the adjustment data to the current modulation means in the same manner as image data; monitor control means for controlling the laser monitor means to detect the laser beam which is pulse-width-modulated by the current modulation means on the basis of the adjustment data supplied from the adjustment supply means, and is emitted from the laser emitting means; pulse adjustment means for adjusting a pulse width of the current modulation means in correspondence with the light amount, which is detected by the laser monitor means under the control of the monitor control means; and adjustment control means for starting data supply by the adjustment supply means and detection control by the monitor control means a predetermined period of time after beam detection of the beam detection means, the modulation pulse width of the laser beam can be appropriately adjusted, and the light amount measurement of the laser beam for the adjustment can be executed at a predetermined position in the main scanning direction, thus making the influences upon adjusting the driving current constant, and satisfactorily adjusting the pulse width.

According to the present invention, in the above image forming apparatus, since the adjustment control means starts data supply by the adjustment supply means and detection control by the monitor control means at a timing when the laser beam deflectively scanned by the beam deflection means is located at a main scanning center of an exposure position of the latent image carrier means, the light amount measurement of the laser beam for adjusting the modulation pulse width can be done at an optimal position in the main scanning direction, thus optimally adjusting the pulse width.

According to the present invention, in the above image forming apparatus, since the adjustment supply means repetitively supplies the adjustment data to the current modulation means, the monitor control means controls the laser monitor means to detect each of laser beams which are repetitively emitted from the laser output means, and the apparatus further comprises average value calculation means for calculating an average value of a plurality of light amounts, which are detected by the laser monitor means under the control of the monitor control means, and the pulse adjustment means adjusts the pulse width of the current modulation means in correspondence with the average value of the light amounts calculated by the average calculation means, the pulse width adjustment can be executed in correspondence with the average value of a plurality of light amounts of the laser beams, thus adjusting the pulse width with high precision.

Since an image forming apparatus according to the present invention comprises: adjustment supply means for generating predetermined adjustment data and repetitively supplying the adjustment data to the current modulation means in the same manner as image data; monitor control means for controlling the laser monitor means to detect each of laser beams, which are pulse-width-modulated by the current modulation means on the basis of the supplied adjustment data, and are repetitively emitted from the laser emitting means; average calculation means for calculating an average value of a plurality of light amounts, which are detected by the laser monitor means under the control of the monitor control means; and pulse adjustment means for adjusting a pulse width of the current modulation means in correspondence with the average value of the light amounts calculated by the average calculation means, the modulation pulse width of the laser beam can be appropriately adjusted, and the adjustment can be done in correspondence with the average value of a plurality of light amounts of the laser beams, thus adjusting the pulse width with high precision.

According to the present invention, in the above image forming apparatus, since the average value calculation means excludes a light amount, which does not satisfy a predetermined allowable range, in advance from the plurality of light amounts as an invalid light amount, and calculates the average value using valid light amounts, the light amount inappropriately measured due to mixed noise is not used in adjustment of the pulse width, thus adjusting the pulse width with higher precision.

According to the present invention, since the above image forming apparatus further comprises operation control means for operating at least the adjustment supply means, the monitor control means, and the pulse adjustment means at a predetermined timing when image formation is not executed, the modulation pulse width of the laser beam is appropriately adjusted at a predetermined timing no image is formed, thus always satisfactorily forming an image which is gradated in units of dots.

According to the present invention, in the above image forming apparatus, since the operation control means operates at least the adjustment supply means, the monitor control means, and the pulse adjustment means upon executing initialization, the modulation pulse width of the laser beam is appropriately adjusted upon executing initialization, thus forming an image on the basis of the appropriately adjusted modulation pulse width.

What is claimed is:

1. An electrophotographic image forming method, in which (a) when a laser beam emitted from laser emitting means in response to a driving current supplied from current supply means is deflected and scanned by beam deflection means in a main scanning direction, and exposes and scans latent image carrier means which moves in a sub-scanning direction, (i) the driving current is pulse-width-modulated by current modulation means in correspondence with externally input image data, (ii) a latent image formed on said latent image carrier means is developed by toner and is transferred onto a recording medium, and (iii) pulse width modulation of the driving current is started a predetermined period of time after beam detection by beam detection means which is located at a position which leads said latent image carrier means in the main scanning direction, (b) when said beam detection means detects the deflectively scanned laser beam, said laser emitting means is controlled to continuously emit a laser beam and laser monitor means detects a light amount of the laser beam, and (c) the driving current of said current supply means is adjusted in correspondence with the detected light amount, comprising the steps of:

generating predetermined adjustment data by adjustment supply means, and supplying the adjustment data to said current modulation means in the same manner as image data;

detecting the laser beam, which is pulse-width-modulated by said current modulation means on the basis of the supplied adjustment data, and is emitted from said laser emitting means, by said laser monitor means under the control of monitor control means; and starting supply of the adjustment data by said adjustment supply means and detection control by said monitor control means a predetermined period of time after beam detection of said beam detection means, when a pulse width of said current modulation means is adjusted in correspondence with the light amount detected by said laser monitor means.

2. An electrophotographic image forming method, in which when a laser beam emitted from laser emitting means in response to a driving current supplied from current supply means is deflected and scanned by beam deflection means in a main scanning direction, and exposes and scans latent image carrier means which moves in a sub-scanning direction, the driving current is pulse-width-modulated by current modulation means in correspondence with externally input image data, and a latent image formed on said latent image carrier means is developed by toner and is transferred onto a recording medium, comprising the steps of:

generating predetermined adjustment data and repetitively supplying the adjustment data to said current modulation means in the same manner as image data;

detecting each of the emitted laser beams, which are pulse-width-modulated by said current modulation means on the basis of the supplied adjustment data by laser monitor means; and calculating an average value of a plurality of detected light amounts, and adjusting a pulse width of said current modulation means in correspondence with the calculated average value of the light amounts.

3. A method according to claim 2, wherein when the average value of the plurality of light amounts is calculated, a light amount which does not satisfy a predetermined allowable range is excluded in advance from the plurality of light amounts as an invalid light amount, and the average value is calculated using valid light amounts.

4. An electrophotographic image forming apparatus, in which (a) when a laser beam emitted from laser emitting means in response to a driving current supplied from current supply means is deflected and scanned by beam deflection means in a main scanning direction, and exposes and scans latent image carrier means which moves in a sub-scanning direction, (i) the driving current is pulse-width-modulated by current modulation means in correspondence with externally input image data, (ii) a latent image formed on said latent image carrier means is developed by toner and is transferred onto a recording medium, and (iii) pulse width modulation of the driving current is started a predetermined period of time after beam detection by beam detection means which is located at a position which leads said latent image carrier means in the main scanning direction, (b) when said beam detection means detects the deflectively scanned laser beam, said laser emitting means is controlled to continuously emit a laser beam and laser monitor means detects a light amount of the laser beam, and (c) the driving current of said current supply means is adjusted in correspondence with the detected light amount, comprising:

adjustment supply means for generating predetermined adjustment data, and supplying the adjustment data to said current modulation means in the same manner as image data;

monitor control means for controlling said laser monitor means to detect the laser beam, which is pulse-width-modulated by said current modulation means on the basis of the supplied adjustment data, and is emitted from said laser emitting means;

pulse adjustment means for adjusting a pulse width of said current modulation means in correspondence with the light amount detected by said laser monitor means under the control of said monitor control means; and adjustment control means for starting data supply by said adjustment supply means and detection control by said monitor control means a predetermined period of time after beam detection of said beam detection means.

5. An apparatus according to claim 4, further comprising operation control means for operating at least said adjustment supply means, said monitor control means, and said pulse adjustment means at a predetermined timing when image formation is not executed.

6. An apparatus according to claim 5, wherein said operation control means operates at least said adjustment supply means, said monitor control means, and said pulse adjustment means upon executing an initialization function of said apparatus.

7. An image forming apparatus comprising:

current supply means for generating a driving current;

laser emitting means for emitting a laser beam in correspondence with the driving current supplied from said current supply means;

beam deflection means for deflecting and scanning the laser beam emitted from said laser emitting means in a main scanning direction;

latent image carrier means exposed and scanned by the laser beam deflectively scanned by said beam deflection means;

beam detection means for detecting the laser beam deflectively scanned by said beam deflection means at a position which leads said latent image carrier means in the main scanning direction;

data input means for externally inputting image data formed by a large number of main scanning lines, which are continuous in a sub-scanning direction;

current modulation means for pulse-width-modulating the driving current generated by said current supply means in correspondence with the image data externally input to said data input means;

exposure control means for starting pulse width modulation in units of main scanning lines by said current modulation means a predetermined period of time after beam detection of said beam detection means;

sub-scanning means for moving an exposure position of said latent image carrier means in the sub-scanning direction;

latent image developing means for developing a latent image formed at the exposure position of said latent image carrier means, which is moved by said sub-scanning means in the sub-scanning direction, by toner;

toner transfer means for transferring a toner image on said latent image carrier means developed by said latent image developing means onto a recording medium;

laser monitor means for detecting a light amount of the laser beam emitted from said laser emitting means;

emission control means for controlling said laser emitting means to continuously emit the laser beam at a timing when the laser beam deflectively scanned by said beam deflection means is detected by said beam detection means;

detection control means for controlling said laser monitor means to detect the laser beam, which is continuously emitted from said laser emitting means under the control of said emission control means;

current adjustment means for adjusting the driving current of said current supply means in correspondence with the light amount, which is detected by said laser monitor means under the control of said detection control means;

adjustment supply means for generating predetermined adjustment data and supplying the adjustment data to said current modulation means in the same manner as image data;

monitor control means for controlling said laser monitor means to detect the laser beam which is pulse-width-modulated by said current modulation means on the basis of the adjustment data supplied from said adjustment supply means, and is emitted from said laser emitting means;

pulse adjustment means for adjusting a pulse width of said current modulation means in correspondence with the light amount, which is detected by said laser monitor means under the control of said monitor control means; and adjustment control means for starting data supply by said adjustment supply means and detection control by said monitor control means a predetermined period of time after beam detection of said beam detection means.

8. An apparatus according to claim 7, wherein said adjustment control means starts data supply by said adjustment supply means and detection control by said monitor control means at a timing when the laser beam deflectively scanned by said beam deflection means is located at a main scanning center of an exposure position of said latent image carrier means.

9. An apparatus according to claim 7, wherein said adjustment supply means repetitively supplies the adjustment data to said current modulation means, said monitor control means controls said laser monitor means to detect each of laser beams which are repetitively emitted from said laser emitting means, and said apparatus further comprises average value calculation means for calculating an average value of a plurality of light amounts, which are detected by said laser monitor means under the control of said monitor control means, and said pulse adjustment means adjusts the pulse width of said current modulation means in correspondence with the average value of the light amounts calculated by said average calculation means.

10. An electrophotographic image forming apparatus, in which when a laser beam emitted from laser emitting means in response to a driving current supplied from current supply means is deflected and scanned by beam deflection means in a main scanning direction, and exposes and scans latent image carrier means which moves in a sub-scanning direction, the driving current is pulse-width-modulated by current modulation means in correspondence with externally input image data, and a latent image formed on said latent image carrier means is developed by toner and is transferred onto a recording medium, comprising:

adjustment supply means for generating predetermined adjustment data and repetitively supplying the adjustment data to said current modulation means in the same manner as image data;

monitor control means for controlling laser monitor means to detect each of laser beams, which are pulse-width-modulated by said current modulation means on the basis of the supplied adjustment data, and are repetitively emitted from said laser emitting means;

average calculation means for calculating an average value of a plurality of light amounts, which are detected by said laser monitor means under the control of said monitor control means; and pulse adjustment means for adjusting a pulse width of said current modulation means in correspondence with the average value of the light amounts calculated by said average calculation means.

11. An apparatus according to claim 10, wherein said average value calculation means excludes a light amount, which does not satisfy a predetermined allowable range, in advance from the plurality of light amounts as an invalid light amount, and calculates the average value using valid light amounts.

12. An electrophotographic image forming method comprising the-steps of:

(a) emitting a laser beam in response to a driving current pulse-width-modulated in correspondence with image data;

(b) scanning a latent image carrier with the laser beam in a main scanning direction while moving the latent image carrier in a sub-scanning direction to form thereon a latent image;

(c) developing the latent image with toner;

(d) transferring the developed toner image onto a recording medium;

(e) generating predetermined adjustment data;

(f) generating a driving current;

(g) pulse-width-modulating the generated driving current in correspondence with the generated adjustment data;

(h) emitting a laser beam modulated in response to the pulse-width-modulated driving current;

(i) detecting the emitted laser beam at a controlled timing when the laser beam is located at a predetermined position in the main scanning direction to obtain a light amount value;

(j) repeating steps (e) to (i) to obtain a plurality of light amount values;

(k) calculating an average value based on the plurality of light amount values; and (l) adjusting a pulse width in correspondence with the average value.

13. A method according to claim 12, wherein the steps (e) to (l) are executed prior to the step of emitting a laser beam in response to a driving current pulse-width-modulated in correspondence with image data.

* * * * *

UNITED STATES PATENT AND TRADEMARK OFFICE
CERTIFICATE OF CORRECTION

| | |
|---|---|
| PATENT NO. | : 6,222,580 B1 |
| DATED | : April 24, 2001 |
| INVENTOR(S) | : Kazuro Yamada |

It is certified that error appears in the above-identified patent and that said Letters Patent is hereby corrected as shown below:

<u>Title page,</u>
Item [56] References Cited, U.S. PATENT DOCUMENTS,
"11/1998 Suzuki" should read -- 8/1998 Suzuki --.

<u>Column 14,</u>
Line 23, "a.convey" should read -- a convey --.

<u>Column 24,</u>
Line 27, "the-steps" should read -- the steps --.

Signed and Sealed this

Fifth Day of March, 2002

Attest:

JAMES E. ROGAN
*Attesting Officer*    *Director of the United States Patent and Trademark Office*

UNITED STATES PATENT AND TRADEMARK OFFICE
CERTIFICATE OF CORRECTION

PATENT NO. : 6,222,580 B1  
DATED : April 24, 2001  
INVENTOR(S) : Kazuro Yamada Page 1 of 1

It is certified that error appears in the above-identified patent and that said Letters Patent is hereby corrected as shown below:

<u>Title page,</u>
Item [56], References Cited, U.S. PATENT DOCUMENTS,
"11/1998 Suzuki" should read -- 8/1998 Suzuki --.

<u>Column 14,</u>
Line 23, "a.convey" should read -- a convey --.

<u>Column 24,</u>
Line 27, "the-steps" should read -- the steps --.

Signed and Sealed this

Sixteenth Day of April, 2002

*Attest:*

JAMES E. ROGAN
*Attesting Officer*   *Director of the United States Patent and Trademark Office*